US012179812B2

(12) United States Patent
Keyser et al.

(10) Patent No.: US 12,179,812 B2
(45) Date of Patent: Dec. 31, 2024

(54) UNIVERSAL HITCH INTERMODAL WELL CAR SYSTEM

(71) Applicant: Trinity Rail Group, LLC, Dallas, TX (US)

(72) Inventors: Grant Keyser, Fort Worth, TX (US); Andrew Brown, Plano, TX (US)

(73) Assignee: TRINITY RAIL GROUP, LLC, Dallas, TX (US)

( * ) Notice: Subject to any disclaimer, the term of this patent is extended or adjusted under 35 U.S.C. 154(b) by 978 days.

(21) Appl. No.: 17/159,911

(22) Filed: Jan. 27, 2021

(65) Prior Publication Data

US 2022/0234628 A1 Jul. 28, 2022

(51) Int. Cl.
*B61D 3/18* (2006.01)
*B60F 1/02* (2006.01)
*B60F 1/04* (2006.01)
*B60F 1/00* (2006.01)

(52) U.S. Cl.
CPC ............... *B61D 3/184* (2013.01); *B60F 1/02* (2013.01); *B60F 1/04* (2013.01); *B60F 1/043* (2013.01); *B60F 1/046* (2013.01); *B61D 3/187* (2013.01); *B61D 3/188* (2013.01); *B60F 1/00* (2013.01); *B60F 1/005* (2013.01)

(58) Field of Classification Search
CPC ........ B61D 3/184; B61D 3/187; B61D 3/188; B60F 1/00; B60F 1/005; B60F 1/02; B60F 1/04; B60F 1/043; B60F 1/046
USPC ............................................. 105/355, 377.03
See application file for complete search history.

(56) References Cited

U.S. PATENT DOCUMENTS

| 4,524,699 A * | 6/1985 | Pavlick | B61D 3/184 410/56 |
| 4,905,608 A * | 3/1990 | Terlecky | B61F 1/08 105/422 |
| 5,074,725 A * | 12/1991 | Pavlick | B61D 3/184 410/20 |

(Continued)

FOREIGN PATENT DOCUMENTS

| CA | 2391107 C * | 1/2008 | |
| CA | 2972399 A1 * | 1/2018 | ............ B61D 15/10 |

(Continued)

OTHER PUBLICATIONS

Canadian Patent Office, Official Action in CA 3,146,328 dated Mar. 20, 2024.

*Primary Examiner* — Zachary L Kuhfuss
*Assistant Examiner* — James William Jones
(74) *Attorney, Agent, or Firm* — Baker Botts L.L.P.

(57) ABSTRACT

A system for a well car includes a frame, a hitch coupled to the frame near the first end of the frame, and a first deck coupled to the frame. The frame includes a first pair of sockets located near a first end of the frame and a second pair of sockets located near a second end of the frame. Each socket of the first pair of sockets is configured to engage a support casting of a first pair of support castings located at a first position along a length of a well car. Each socket of the second pair of sockets is configured to engage a support casting of a second pair of support castings located at a second position along the length of the well car. The first deck is configured to hold wheels of a trailer when the trailer is coupled to the hitch.

12 Claims, 9 Drawing Sheets

(56) References Cited

U.S. PATENT DOCUMENTS

| | | | | | |
|---|---|---|---|---|---|
| 5,564,341 | A | * | 10/1996 | Martin | B61G 5/02 |
| | | | | | 105/199.1 |
| 5,611,285 | A | * | 3/1997 | Saxton | B61D 3/184 |
| | | | | | 410/55 |
| 7,255,047 | B1 | * | 8/2007 | Coslovi | B61D 3/187 |
| | | | | | 105/355 |
| 8,973,508 | B2 | * | 3/2015 | Al-Kaabi | B61D 3/14 |
| | | | | | 105/355 |
| 9,656,678 | B2 | * | 5/2017 | Morel | B61D 3/18 |
| 2003/0097956 | A1 | * | 5/2003 | Khattab | B61D 45/007 |
| | | | | | 105/355 |
| 2019/0047595 | A1 | * | 2/2019 | Sivakumar | B61D 3/16 |
| 2020/0156672 | A1 | * | 5/2020 | Andre | B61D 3/184 |

FOREIGN PATENT DOCUMENTS

| | | | | | | |
|---|---|---|---|---|---|---|
| CN | 1443128 | A | * | 9/2003 | | B61D 3/184 |
| CN | 106476817 | A | * | 3/2017 | | B61D 3/184 |
| EP | 2100790 | A1 | * | 9/2009 | | B61D 3/184 |
| EP | 3296175 | A1 | * | 3/2018 | | B61D 3/184 |
| GB | 2272874 | A | * | 6/1994 | | B61D 3/184 |
| GB | 2283219 | A | * | 5/1995 | | B61D 3/184 |
| GB | 2434131 | A | * | 7/2007 | | B61D 3/184 |

* cited by examiner

UNIVERSAL HITCH INTERMODAL WELL CAR SYSTEM

TECHNICAL FIELD OF THE INVENTION

This disclosure relates generally to configuring a railroad car (also referred to as a "railcar") and, more particularly, to a universal hitch intermodal well car system for converting between a well car for intermodal container transport and a well car adapted to transport semi-trailers.

BACKGROUND

Railroad well cars are configured to store and transport intermodal containers across long distances. Some "all-purpose" well cars are also equipped with hitches, which allow them to carry trailers in addition to intermodal containers.

SUMMARY

According to an embodiment, a system for a well car includes a frame, a hitch, and a first deck. The frame includes a first pair of sockets located near a first end of the frame and a second pair of sockets located near a second end of the frame opposite the first end of the frame. Each socket of the first pair of sockets is configured to engage a support casting of a first pair of support castings located at a first position along a length of a well car. Each socket of the second pair of sockets is configured to engage a support casting of a second pair of support castings located at a second position along the length of the well car. The hitch is coupled to the frame near the first end of the frame. The first deck is coupled to the frame and is configured to hold wheels of a trailer when the trailer is coupled to the hitch.

According to another embodiment, a method includes coupling a trailer to a well car system. The well car system includes a frame, a hitch, and a first deck. The frame includes a first pair of sockets located near a first end of the frame and a second pair of sockets located near a second end of the frame opposite the first end of the frame. Each socket of the first pair of sockets is configured to engage a corresponding support casting of a first pair of support castings located at a first position along a length of a well car. Each socket of the second pair of sockets is configured to engage a corresponding support casting of a second pair of support castings located at a second position along the length of the well car. The hitch is coupled to the frame near the first end of the frame. The first deck is coupled to the frame and is configured to hold wheels of a trailer when the trailer is coupled to the hitch. The method also includes inserting the well car system into a well car. Inserting the well car system into the well car includes engaging each support casting of the first pair of support castings with the corresponding socket of the first pair of sockets and engaging each support casting of the second pair of support castings with the corresponding socket of the second pair of sockets.

According to a further embodiment, a system includes a well car, a frame, a hitch, and a first deck. The frame includes a first pair of sockets located near a first end of the frame and a second pair of sockets located near a second end of the frame opposite the first end of the frame. Each socket of the first pair of sockets is releasably engaged to a support casting of a first pair of support castings located at a first position along a length of the well car. Each socket of the second pair of sockets is releasably engaged to a support casting of a second pair of support castings located at a second position along the length of the well car. The hitch is coupled to the frame near the first end of the frame. The first deck coupled to the frame and is configured to hold wheels of a trailer when the trailer is coupled to the hitch.

Certain embodiments of the well system provide one or more technical advantages. For example, an embodiment enables the use of intermodal well cars for transporting both intermodal containers and semi-trailers. As another example, an embodiment allows the use of a trailer hitch in an intermodal well car without any installation of the hitch, other than placing the system onto the support castings of the well car. As a further example, an embodiment reduces the empty weight and increases the load capacity of a well car that is configured to carry semi-trailers. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Railroad well cars are configured to store and transport intermodal containers across long distances. Some "all-purpose" well cars are equipped with hitches, which allow them to carry semi-trailers in addition to intermodal containers. However, when carrying intermodal containers, these all-purpose well cars are less efficient than traditional well cars, due to the weight added by the hitch and any associated structural changes made to the well car to accommodate the hitch. Because of this added weight, all-purpose well cars have a lower load capacity than traditional well cars.

This disclosure contemplates a well car system that can be used to convert between a traditional well car for intermodal container transport and a well car adapted to transport semi-trailers. The system includes at least one hitch onto which a trailer can be attached, as well as one or more decks on which the trailer's wheels may rest. The hitch and deck(s) are both coupled to a frame that is adapted to mount into the well car in a similar manner as an intermodal container—by fitting onto the four support castings of the well car. In this manner, the system (which takes the form of an insert that can be moved into and out of a well car) enables a traditional well car to carry semi-trailers, when needed, without sacrificing the load capacity of the well car when used to transport intermodal containers.

Embodiments of the present disclosure and its advantages are best understood by referring to FIGS. 1 through 5 of the drawings, like numerals being used for like and corresponding parts of the various drawings.

Figure 1:
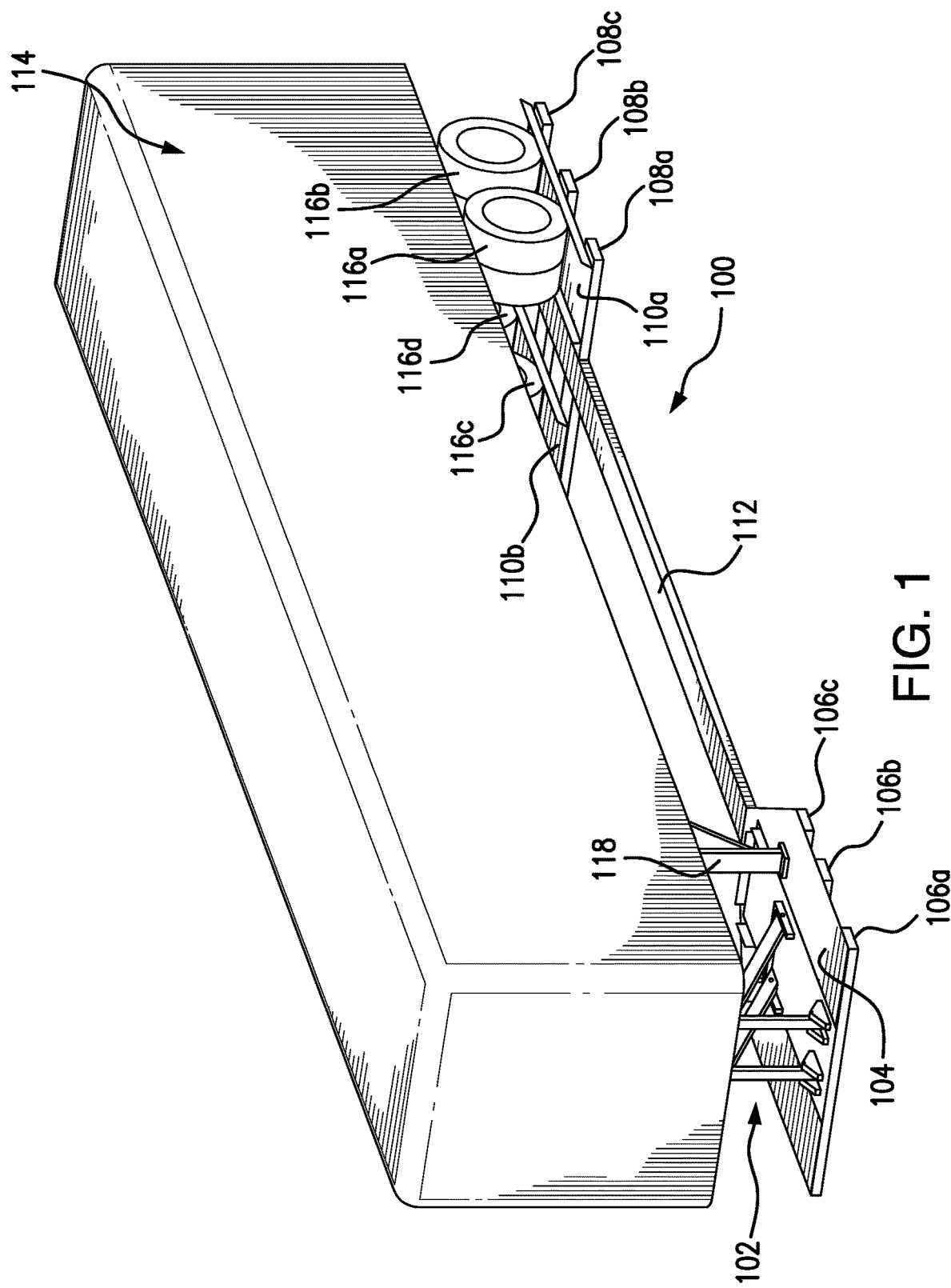
FIG. 1 illustrates an example well car system, to which a semi-trailer is attached.

FIG. 1 illustrates an example well car insert 100, to which a semi-trailer 114 is attached. Well car insert 100 includes hitch 102, hitch platform 104, wheel decks 110a and 110b, and a support frame that includes first member 112, second members 106a through 106c, and third members 108a through 108c. First member 112 is designed to span at least a portion of the length of a well car, and to run along the middle of the well car, when well car insert 100 is positioned within the well car. In certain embodiments, first member 112 may include telescoping members, such that first member 112 is adjustable in length to accommodate different sized well cars. Second members 106a through 106c are attached to first member 112 near a first end of first member 112. Second members 106a through 106c are designed to span at least a portion of the width of a well car and to support platform 104, on which hitch 102 is attached. Platform 104 is shaped such that, when semi-trailer 114 is attached to hitch 102, the sand shoes of the trailer landing gear 118 of the trailer rest on platform 104. Third members 108a through 108c are attached to first member 112 near the second end of first member 112. Third members 108a through 108c are designed to span at least a portion of the width of a well car and to support one or more decks 110a and 110b. Decks 110a and 110b are designed such that, when semi-trailer 114 is attached to hitch 102, the wheels 116a through 116d of the semi-trailer rest on the decks. For example, as illustrated in FIG. 1, wheels 116a and 116b of semi-trailer 114 may rest on first deck 110a, and wheels 116c and 116d of semi-trailer 114 may rest on second deck 110b. The components of well car insert 100 are described in further detail below, in the discussion of FIGS. 2A through 2C.

Figure 2A:
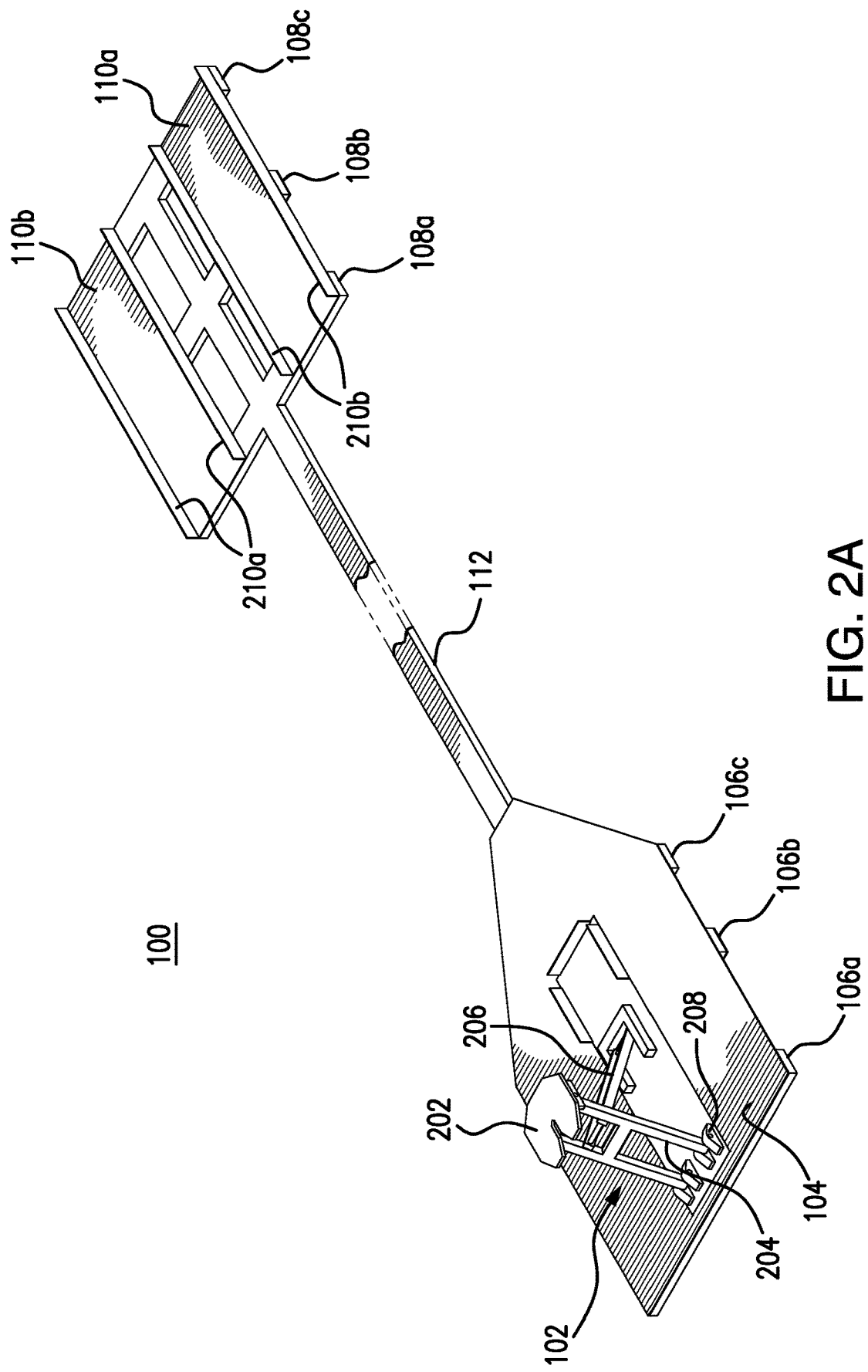
FIGS. 2A through 2C illustrate various views and configurations of the example well car system of FIG. 1.
Figure 2B:
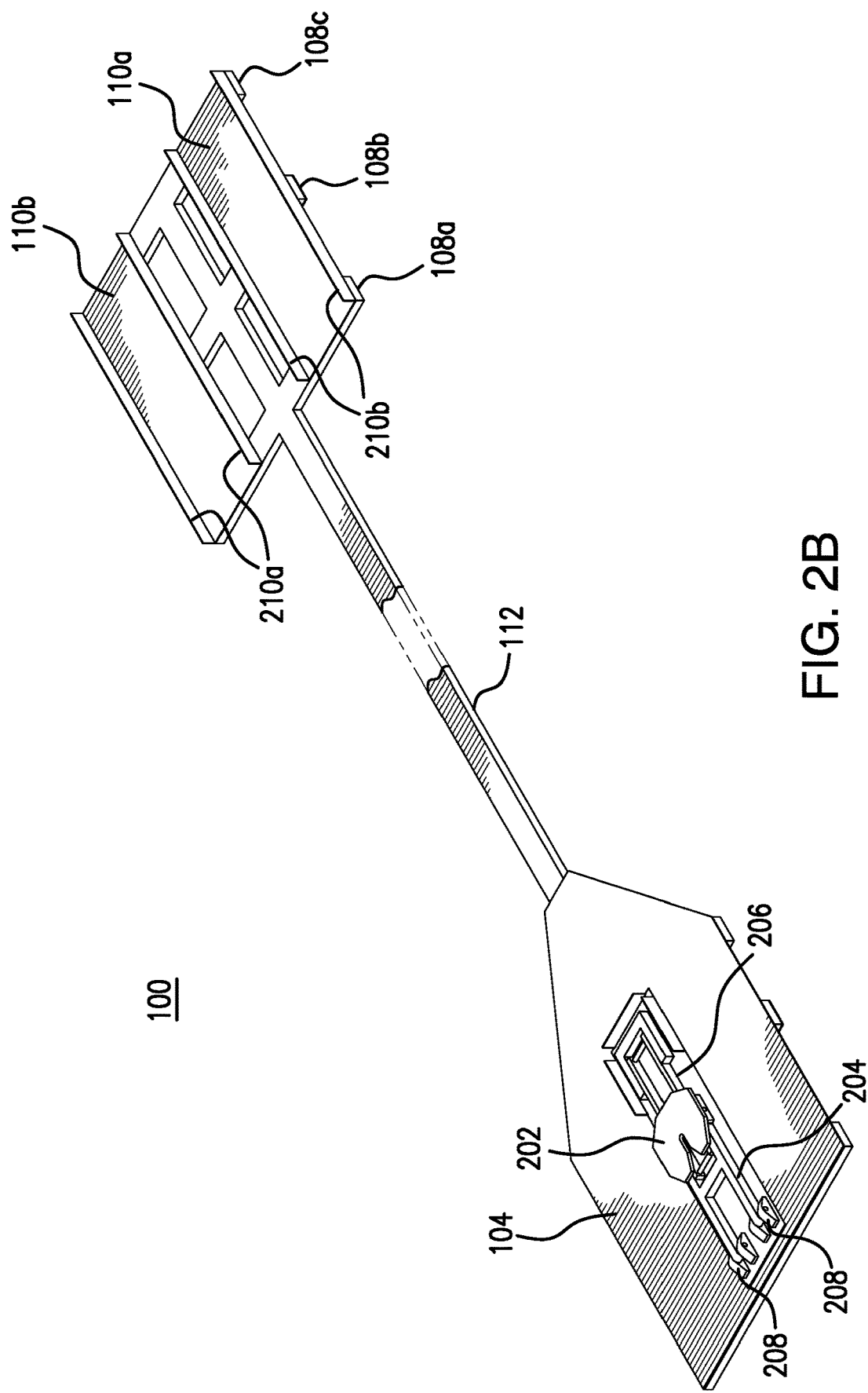
Figure 2C:
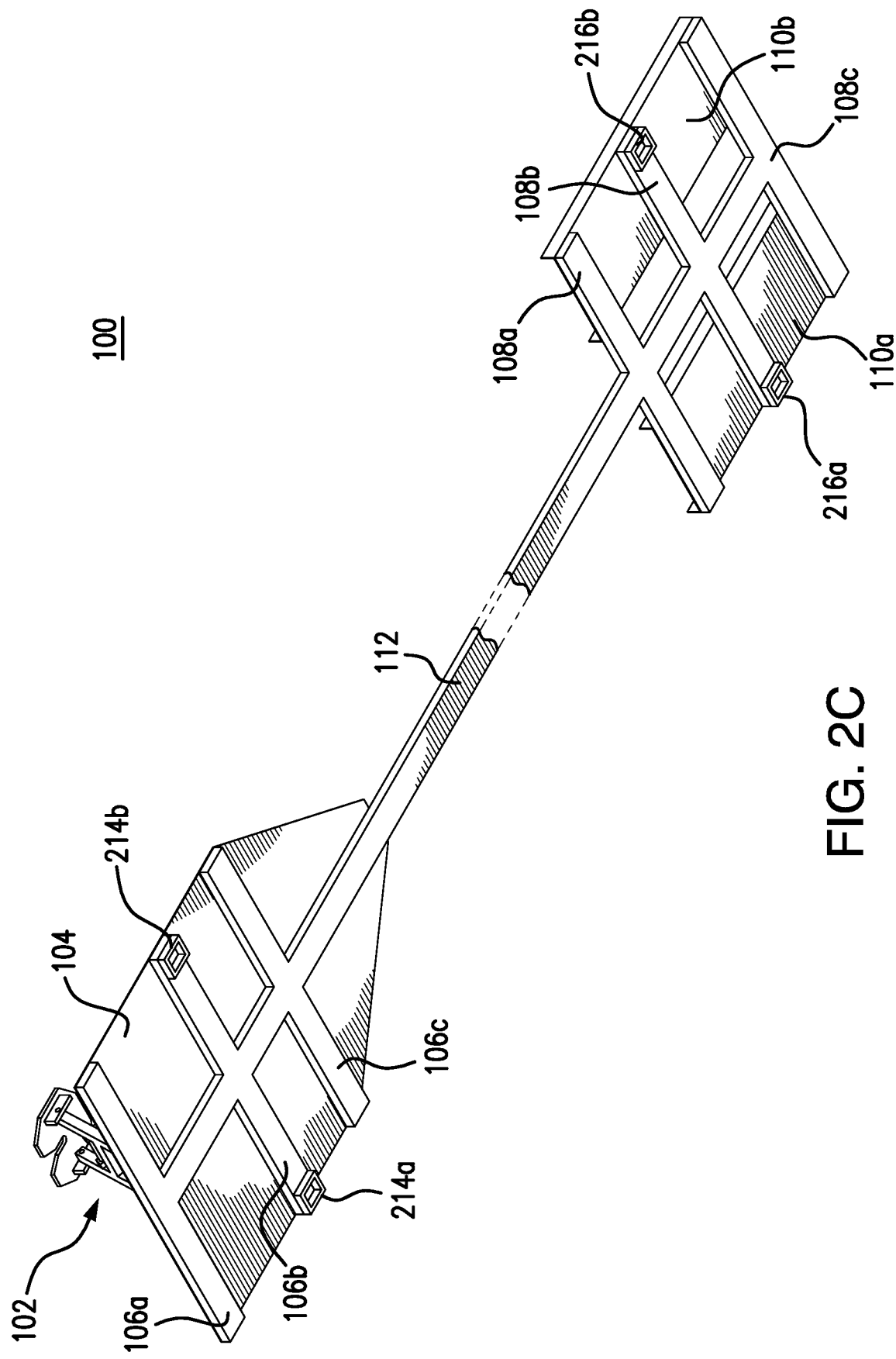

FIGS. 2A through 2C present various views of the example well car insert presented in FIG. 1. In particular, FIG. 2A presents a view of the upper surface of insert 100, in which hitch 102 is configured in its fully extended, erect position, FIG. 2B presents a similar view of the upper surface of insert 100, but with hitch 102 configured in its collapsed, horizontal position, and FIG. 2C presents a view of the lower surface of insert 100.

As illustrated in FIGS. 2A through 2C, in certain embodiments, each member of the set of second members 106a through 106c and/or the set of third members 108a through 108c is centered around first member 112 and extends from either side of first member 112 in a direction generally perpendicular to first member 112. For example, as illustrated in FIG. 2C, a first portion of each of second members 106a through 106c may extend in a perpendicular direction away from a side of first member 112, and a second portion of each of second members 106a through 106c may extend in a perpendicular direction away from the opposite side of first member 112, such that each of second members 106a through 106c are approximately centered around first member 112. Similarly, as illustrated in FIGS. 2A through 2C, a first portion of each of third members 108a through 108c may extend in a perpendicular direction away from a side of first member 112, and a second portion of each of third members 108a through 108c may extend in a perpendicular direction away from the opposite side of first member 112, such that each of third members 108a through 108c are approximately centered around first member 112.

Each of first member 112, second members 106a through 106c, and third members 108a through 108c, which together form the frame of insert 100, can be formed from any suitable material. For example, in certain embodiments, one or more of members 112, 106a through 106c, and/or 108a through 108c may be formed from a metal, such as steel. In certain embodiments, one or more of members 112, 106a through 106c, and/or 108a through 108c are hollow. In some embodiments, one or more of members 112, 106a through 106c, and/or 108a through 108c are solid.

First member 112, second members 106a through 106c, and third members 108a through 108c may be coupled together in any suitable manner to form the frame of insert 100. As an example, in certain embodiments, first member 112, second members 106a through 106c, and third members 108a through 108c are integrally formed as a single piece. For instance, the frame of insert 100 may be formed through a casting process. As another example, in some embodiments, first member 112 may be formed separately from each of second members 106a through 106c, and third members 108a through 108c, which are then coupled to first member 112. For example, each of second members 106a through 106c and third members 108a through 108c may include two separate portions, and each separate portion may be welded or otherwise attached to a side of first member 112 (e.g., the first portion welded to a first side of first member 112, and the second portion welded to the opposite side of first member 112). In some embodiments, each of second members 106a through 106c and third members 108a through 108c may be a continuous piece of material and may be welded or otherwise attached to the underside of first member 112.

While FIGS. 2A through 2C illustrate the use of a single first member 112, three second members 106a through 106c, and three third members 108a through 108c, this disclosure contemplates that any number of first members 112, second members 106a through 106c, and third members 108a through 108c may be used to form the frame of insert 100. Additionally, while illustrated in FIGS. 2A through 2C as being straight and having a rectangular cross-section, first member 112, second members 106a through 106c, and third members 108a through 108c may be of any suitable geometry. Furthermore, while illustrated in FIGS. 2A through 2C as second members 106a through 106c and third members 108a through 108c being perpendicular to first member 112, each of second members 106a through 106c and third members 108a through 108c may be aligned in any manner relative to first member 112 and/or any other of second members 106a through 106c and third members 108a through 108c.

As illustrated in FIGS. 2A through 2C, in certain embodiments, hitch 102 is positioned on insert 100 near a first end of first member 112, and above the centers of second members 106a through 106c, such that when trailer 114 is attached to insert 100, trailer 114 and insert 100 may fit within a well car. In certain embodiments, and as illustrated in FIGS. 2A through 2C, hitch 102 sits on a platform 104 that itself is positioned near the first end of first member 112 and above second members 106a through 106c. Platform 104 may be formed from any suitable material and attached to first member 112 and/or second members 106a through 106c in any suitable manner. As an example, in certain embodiments, platform 104 is formed from metal and is welded to first member 112 and/or second members 106a through 106c. As another example, in certain embodiments, platform 104 may be integrally formed with first member 112 and/or second members 106a through 106c during a casting process. Platform 104 may be any suitable shape. For example, in certain embodiments, and as illustrated in FIGS. 2A through 2C, platform 104 includes two sections—a rectangular section and a tapered section. The rectangular section of platform 104 is positioned above second members 106a through 106c and holds hitch 102. The tapered section is coupled to the rectangular section and extends in a direction towards the longitudinal center of insert 100, tapering towards first member 112. Such tapering may be desirable in order to reduce the amount of material used to form platform 104. In some embodiments, platform 104 may extend the full length and width of insert 100. For example, platform 104 may include decks 110a and/or 110b. Hitch 102 may be attached to platform 104, first member 112, and/or second members 106a through 106c in any suitable manner. For example, in certain embodiments, hitch 102 is coupled to platform 104 and first member 112 using mechanical fasteners that extend through platform 104 and into first member 112.

Certain embodiments of insert 100 do not include platform 104. In such embodiments, hitch 102 may be attached directly to first member 112 and/or one or more of second members 106a through 106c. For example, hitch 102 may be coupled to first member 112 and/or one or more of second members 106a through 106c using mechanical fasteners. In certain such embodiments, first member 112 may be of a suitable width to hold hitch 102, and to hold the sand shoes of the landing gear 118 of a trailer 114 (as illustrated in FIG. 1). In some such embodiments, one or more of second members 106a through 106c may be of a suitable width and/or located at a suitable position along first member 112 to hold the sand shoes of trailer landing gear 118.

Hitch 102 may be any suitable hitch for use with semi-trailers. For example, while FIGS. 2A through 2B illustrate the use of a collapsible hitch, in certain embodiments, hitch 102 is a fixed, non-collapsible hitch. Furthermore, in embodiments in which hitch 102 is collapsible, hitch 102 may be collapsible in any suitable manner.

FIG. 2A illustrates collapsible hitch 102 in an erected position. Collapsible hitch 102 includes king pin receiving plate 202, receiving plate support member 204, and diagonal support member 206. These components may be interconnected with any number of pivotal members provided from moving hitch 102 from a collapsed position to an erected position. Kingpin receiving plate 202 is configured to engage a kingpin of a semi-trailer to secure the semi-trailer to the hitch. Kingpin receiving plate 202 is mounted onto a top end of receiving plate support member 204. In certain embodiments, kingpin receiving plate 202 may be pivotally mounted onto the top end of receiving plate support member 204. The bottom end of receiving plate support member 204 is secured to the frame of well insert 100. For example, in certain embodiments, and as illustrated in FIGS. 2A and 2B, the bottom end of receiving plate support member 204 is secured to platform 104. In some embodiments, the bottom end of receiving plate support member 204 is secured to first member 112, and/or one or more of second members 106a through 106c. In certain embodiments, the bottom end of receiving plate support member 204 is pivotally secured to platform 104 (e.g., through attachment locations 208), first member 112, and/or one or more of second members 106a through 106c. In certain embodiments, receiving plate support member 204 is composed of a single leg. In some embodiments, receiving plate support member 204 is composed of a pair of legs.

Receiving plate support member 204 is maintained in its erect position by diagonal support member 206. Diagonal support member 206 is coupled to receiving plate support member 204 near the top end of receiving plate support member 204. For example, in certain embodiments in which receiving plate support member 204 is composed of a single leg, diagonal support member 206 may be coupled to the leg of receiving plate support member 204 near the top end of the leg of receiving plate support member 204. In some embodiments in which receiving plate support member 204 is composed of a pair of legs, diagonal support member 206 may be coupled to receiving plate support member 204 between the pair of legs. For example, in certain such embodiments, diagonal support member 206 may be coupled directly to each leg of the pair of legs of receiving plate support member 204, by coupling to an inner surface of each leg of the pair of legs, where the inner surface of each leg faces the inner surface of the other leg. As another example, in certain such embodiments, diagonal support member 206 may be coupled to receiving plate support member 204 through a horizontal structure, such as a pin, which spans the distance between the pair of legs, near the top end of receiving plate support member 204. For example, the horizontal structure may extend through the first leg of receiving plate support member 204, then through one or more legs of diagonal support member 206, and then through the second leg of receiving plate support member 204. In certain embodiments, a top end of diagonal support member 206 is pivotally coupled to receiving plate support member 204 near the top end of receiving plate support member 204. In certain embodiments, diagonal support member 206 is pivotally coupled to the frame of well insert 100 (e.g., platform 204, first member 112, and/or one or more of second members 106a through 106c) at a bottom end of diagonal support member 206.

In certain embodiments, hitch 102 includes a locking mechanism, such that when diagonal support member 206 is supporting receiving plate support member 204 in its erect position, the locking mechanism may be engaged to maintain receiving plate support member 204 in its erect position. This disclosure contemplates the use of any type of locking mechanism to maintain receiving plate support member 204 in its erect position. As an example, in certain embodiments, the locking mechanism is configured to automatically engage in response to receiving plate support member 204 being moved to its erect position. As another example, in certain embodiments, the locking mechanism may be manually engaged after receiving plate support member 204 is moved to its erect position. As a specific example of a locking mechanism, in certain embodiments, diagonal support member 206 may contain a first leg and a second leg telescoped within the first leg, such that when diagonal support member 206 is in the collapsed position, a first portion of the second leg is within the first leg, and when diagonal support member 206 is maintaining receiving plate support member 204 in its erect position, a second portion of the second leg (that is less than the first portion) is within the first leg. In certain such embodiments, the first leg and the second leg of diagonal support member 206 may each contain a hole running through the legs, such that when maintaining receiving plate support member 204 in its erect position, the hole of the first leg aligns with the hole of the second leg and a locking pin may be inserted through the holes to prevent movement of the second leg within the first leg, thereby locking receiving plate support member 204 in its erect position.

FIG. 2B illustrates hitch 102 in a collapsed configuration. Any suitable method may be used to convert between the collapsed configuration of FIG. 2B, and the erect configuration of FIG. 2A. As an example, in certain embodiments, hitch 102 is configured to be pulled from a collapsed configuration (as illustrated in FIG. 2B, for example) to an erect configuration (as illustrated in FIG. 2A, for example).

For example, a hook may be attached to hitch 102 (e.g., attached to kingpin receiving plate 202) and used to pull kingpin receiving plate 202, receiving plate support member 204, and diagonal support member 206 from a collapsed to an erect position. As another example, in certain embodiments in which diagonal support member 206 includes telescoping legs, one telescoping leg may form an air chamber while the other may form a piston within the air chamber. Receiving plate support member 204 may then be erected from a collapsed position by supplying air to the air chamber.

In certain embodiments, once receiving plate support member 204 has been erected and a locking mechanism has been engaged to maintain kingpin receiving plate 202, receiving plate support member 204, and diagonal support member 206 in their erect positions, a semi-trailer may be secured to well insert 100, by engaging a kingpin of the semi-trailer with kingpin receiving plate 202. After the semi-trailer has been disengaged from kingpin receiving plate 202, receiving plate support member 204, diagonal support member 206, and kingpin receiving plate 202 may be returned to their collapsed positions by disengaging the locking mechanism. In certain embodiments, and as illustrated in FIGS. 2A and 2B, when hitch 102 collapses, kingpin receiving plate 202 moves in a direction towards the center of insert 100. In some embodiments, when hitch 102 collapses, kingpin receiving plate 202 moves in a direction away from the center of insert 100. In certain embodiments in which diagonal support member 206 includes telescoping parts which consist of a piston and air chamber, once the locking mechanism has been disengaged, the piston system may cushion the fall of kingpin receiving plate 202, receiving plate support member 204, and diagonal support member 206 from their erected positions to their collapsed positions. In certain embodiments, the frame of insert 100 may include a recess into which hitch 102 sits, such that when hitch 102 is in its collapsed configuration, kingpin receiving plate 202 is generally flush with the frame.

In addition to the collapsible hitch described above, this disclosure contemplates the use of any other type of hitch coupled to the frame of well car insert 100. For example, any type of support structure may be used to support kingpin receiving plate 202, including, in certain embodiments, a support structure that does not include receiving plate support member 204. As another example, in certain embodiments, the hitch is a fixed hitch rather than a collapsible hitch, such that receiving plate support member 204, diagonal support member 206 (if present), and kingpin receiving plate 202 are not configured to move when attached to the frame of well insert 100. As a further example, in certain other embodiments, receiving plate support member 204 is composed of one or more telescoping elements, such that the hitch may telescope vertically, from a low, stored position to a higher working position, where it may then be locked into place for use.

When the kingpin of a semi-trailer is engaged with kingpin receiving plate 202, decks 110a/110b are used to hold the wheels of the trailer. Decks 110a/110b may be any suitable size sufficient to accommodate the wheels of conventional semi-trailers. For example, decks 110a/110b may be of a suitable length to accommodate various lengths of semi-trailers (e.g., both 40 foot semi-trailers and 53 foot semi-trailers). In some embodiments, well car insert 100 may include a single deck 110a/110b that is configured to hold the wheels on both sides of a semi-trailer. In certain embodiments, and as illustrated in FIGS. 2A through 2C, well car insert 100 includes a pair of decks 110a and 110b, with each deck configured to hold the wheels on one side of a semi-trailer. The use of a pair of decks 110a and 110b may be desirable to reduce the amount of material that is used to manufacture decks 110a/110b.

Deck(s) 110a/b may be attached to the frame of insert 100 at any suitable location and in any suitable manner. As an example, in certain embodiments that include two decks 110a and 110b, and as illustrated in FIGS. 2A through 2C, decks 110a and 110b are attached to third members 108a through 108c of insert 100. For example, deck 110a is positioned on top of the portion of each of third members 108a through 108c that extends from a first side of first member 112, and deck 110b is positioned on top of the portion of each of third members 108a through 108c that extends from the opposite side of first member 112. As another example, in certain embodiments that include a single deck 110a/b, the deck is positioned on top of first member 112. Deck(s) 110a/b may be formed from any suitable material. For example, in certain embodiments, decks 110a/b are formed from steel and are welded to the frame of well car insert 100. In other embodiments, decks 110a/b may be cast together with the frame of well car insert 100, as a single piece of material.

Deck(s) 110a/b may include one or more features to help prevent a semi-trailer that is connected to insert 100 from moving, while the well car in which insert 100 is installed is in motion. As an example, in certain embodiments, decks 140 may contain ledges 210a and 210b along the outer edges of decks 110a and 110b. This may be desirable to help prevent the tires of a semi-trailer from falling off of decks 110a and/or 110b, when the kingpin of the semi-trailer is engaged with kingpin receiving plate 105 and the well car in which well car insert 100 is placed is in motion. As another example, decks 110a/b may be configured for use with wheel chocks and/or any other suitable tie down system for restraining the movement of one or more wheels of a semi-trailer, when the semi-trailer is connected to insert 100. For example, decks 110a/b may include grating to accommodate wheel chocks that are configured to lock into such grating.

FIG. 2C illustrates the underside of well car insert 100. In order to couple to a standard railroad well car, well car insert 100 includes a set of sockets 214a, 214b, 216a, and 216b. These sockets are configured to engage the conventional support castings of a well car, such that when each of sockets 214a/b, and 216a/b is engaged to a support casting of the well car, well car insert 100 may be maintained in position on the well car by the force of gravity, without the aid of any mechanical fasteners. In this manner, certain embodiments of well car insert 100 enable easy installation and removal of well car insert 100, such that a conventional well car for intermodal container transport may be converted to a well car for transporting semi-trailers with minimal effort.

As illustrated in FIG. 2C, sockets 214a/b and 216a/b are located on the underside of the frame of well car insert 100 in two pairs—a first pair of sockets 214a and 214b are located at a first position along the length of well car insert 100, and a second pair of sockets 216a and 216b are located at a second position along the length of the insert. The longitudinal spacing between the first position along the length of the well car insert 100 and the second position along the length of the well car insert 100 is chosen to be approximately equal to the longitudinal spacing between a first pair of well car support castings and a second pair of well car support castings located on a well car in which well car insert 100 is to be placed. For example, the first position along the length of well car insert 100 may be located closer to the hitch 102 than to the decks 110*a/b*, while the second position along the length of well car insert 100 may be located closer to the decks 110*a/b* than to the hitch 102. In certain embodiments in which the frame of well car insert 100 includes first member 112, second members 106*a* through 106*c*, and third members 108*a* through 108*c*, the first position may be located along one of second members 106*a* through 106*c* and the second position may be located along one of third members 108*a* through 108*c*. For example, as illustrated in FIG. 2C, first pair of sockets 214*a* and 214*b* may be located on second member 106*b*, and the second pair of sockets 216*a* and 216*b* may be located on third member 108*b*. The horizontal spacing between each socket of the first pair of sockets 216*a/b* and each socket of the second pair of sockets 218*a/b* is configured to be approximately equal to the horizontal spacing between each support casting of the first pair of well car support castings and each support casting of the second pair of support castings, where both pairs of support castings are located on a well car on which well car insert 100 is to be placed. For example, as illustrated in FIG. 2C, socket 214*a* is located near a first end of second member 106*b* and socket 214*b* is located near the opposite end of second member 106*b*. Similarly, socket 216*a* is located near a first end of third member 108*b* and socket 216*b* is located near the opposite end of third member 108*b*. In such embodiments, second member 106*b* is configured to run along at least a portion of the width of a well car along at a first position along the length of the well car that includes a first pair of support castings. Similarly, third member 108*c* is configured to run along at least a portion of the width of a well car along at a second position along the length of the well car that includes a second pair of support castings.

Sockets 214*a/b* and 216*a/b* may be configured to fit on top of the support castings of any standard sized well car, including, for example, well cars that transport containers of lengths 20 feet, 40 feet, 53 feet, or any other length. For example, in certain embodiments different models of well car insert 100 may be produced, each model configured to fit a given length of a well car. In other embodiments, the frame of well car insert 100 may be configured to expand or contract in length in order to accommodate a variety of different lengths of well cars. In certain embodiments, such expansion and/or contraction of well car insert 100 may be accomplished through the use of a telescoping member. For example, first member 112 may be a telescoping member consisting of a first section on which hitch 102 is coupled and a second section on which decks 110*a/b* are located, with the first or second section telescoping into the other section.

Figure 3A:
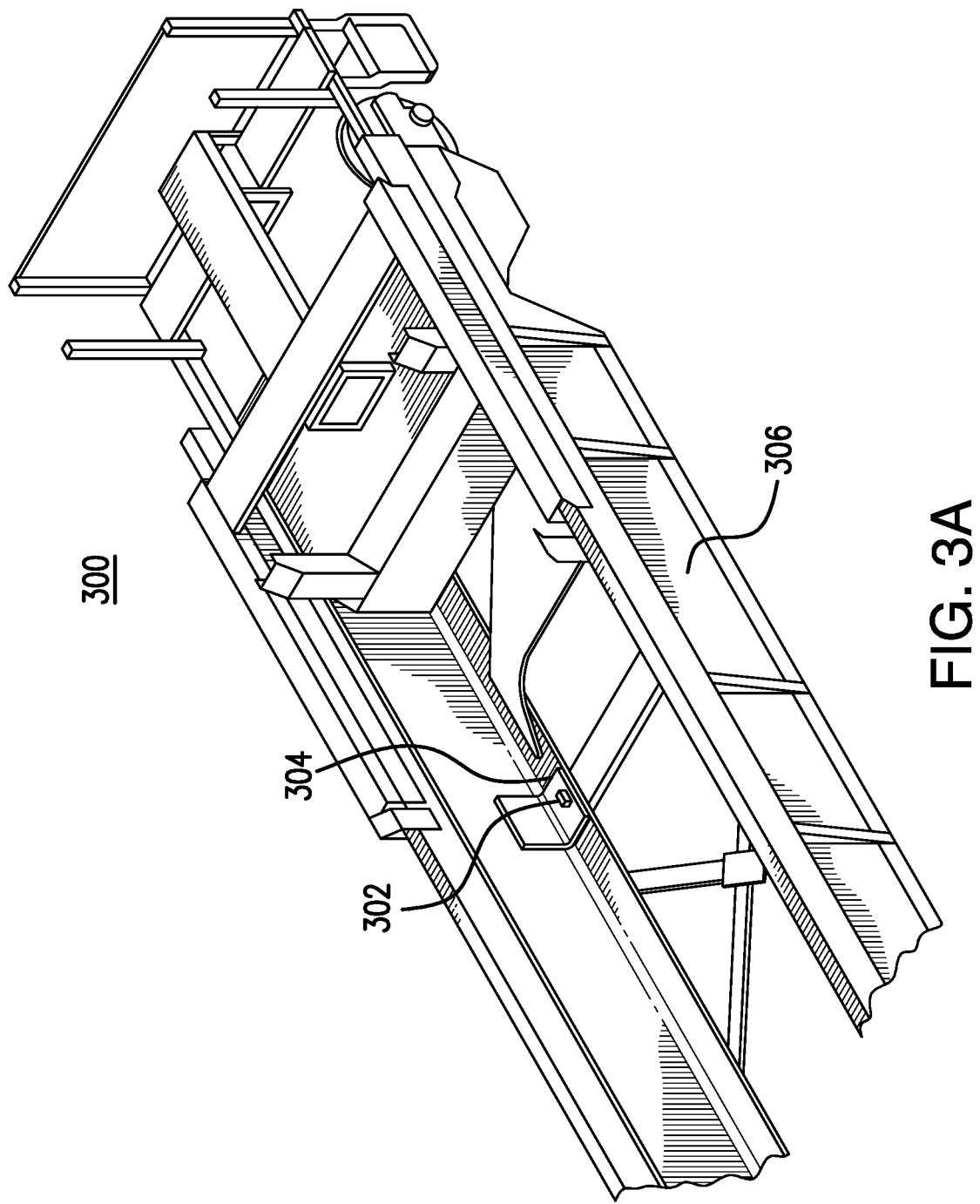
FIGS. 3A through 3C illustrate the use of the example well car system of FIG. 1 to transport a semi-trailer in a well car.
Figure 3B:
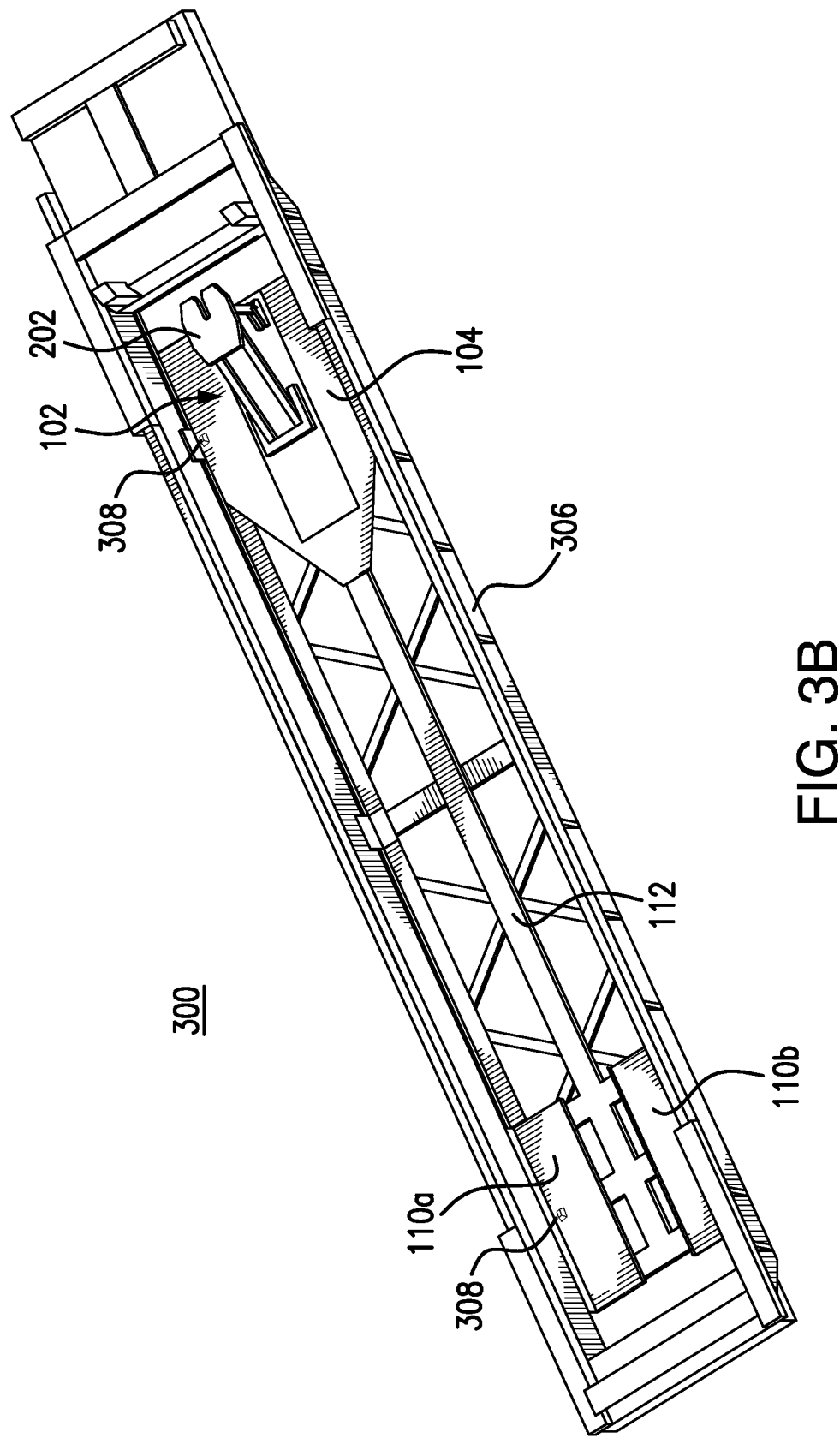
Figure 3C:
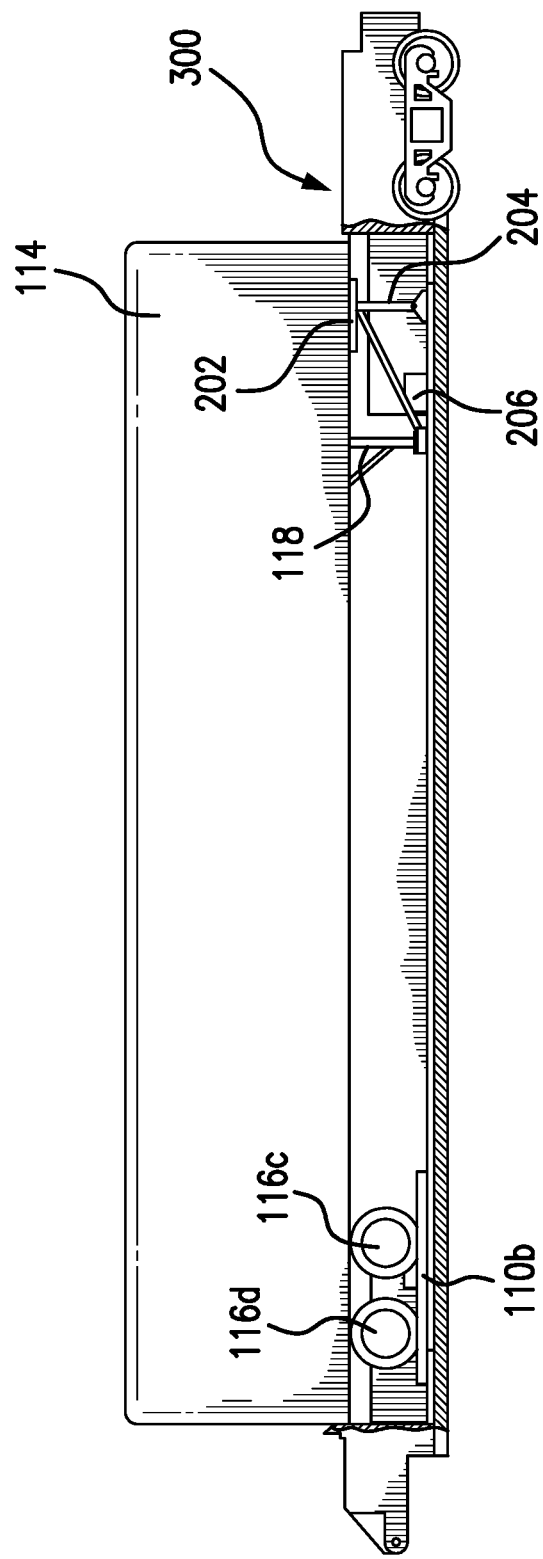

FIGS. 3A through 3C illustrate the use of well car insert 100 in a well car 300 to transport a semi-trailer 114. FIG. 3A illustrates the location of support casting 302 on a floor 304 of a conventional well car 300. While not shown in FIG. 3A, this disclosure contemplates that a second support casting is located opposite support casting 302 at the same longitudinal location on well car 300 as support casting 302, and an additional pair of support castings are located on the opposite end of well car 300.

FIG. 3B presents an example illustrating the positioning of well car insert 100 within a conventional well car 300. As illustrated, first member 112 of well car insert 100 spans a length of well car 300, and platform 104 as well as decks 110*a/b* are of a suitable size/width to fit between the sidewalls 306 of well car 300. As described above, the dimensions of second members 106*a* through 106*c* and third member 108*a* through 108*c* of well car insert 100 are such that, when placed on well car 300, sockets 214*a/b* and 216*a/b* of well car insert 100, as illustrated in FIG. 2C, fit onto the support castings 302 of well car 300, as illustrated in FIG. 3A. In certain embodiments, the opening of the space created by each socket 214*a*, 214*b*, 216*a*, and/or 216*b*, is slightly larger than the size of a conventional well car support casting 302. In this manner, well car insert 100 may easily fit on top of the well car support castings and may also experience minimal movement about the well car support castings, while the well car is in motion.

As illustrated in FIG. 3B, in certain embodiments, well car insert 100 may include a set of pedestals 308. Each pedestal 308 is positioned on an upper surface of well car insert 100 at a location directly above a socket 214*a*, 214*b*, 216*a*, or 216*b* that is positioned on the lower surface of well car insert 100 (as illustrated in FIG. 2C). For example, in certain embodiments, a first pair of pedestals 308 may be located on top of platform 104, and a second pair of pedestals 308 may be located on decks 110*a* and 110*b*. In particular, a first pedestal 308 may be positioned on the surface of platform 104 near a first side of the platform, and a second pedestal (obscured in FIG. 3B by sidewall 306) may be positioned on the surface of platform 104, at the same longitudinal location as the first pedestal and near the opposite side of the platform. Similarly, a pedestal 308 may be located on the surface of deck 110*a*, near the outer edge of the deck, and another pedestal (obscured in FIG. 3B by sidewall 306) may be positioned on the surface of deck 110*b*, at the same longitudinal location as the pedestal on deck 110*a* and near the outer edge of the deck.

The presence of pedestals 308 may enable stacking of multiple well car inserts 100 on top of one another. In particular, when hitch 102 is in a collapsed configuration, the sockets 214*a/b* and 216*a/b* of a second well car insert may be configured to engage not only the support castings 302 of a well car 300 but also the pedestals 308 of well car insert 100. This may be desirable for transporting multiple well car inserts 100 within a single well car 300, when the inserts are not in use. Additionally, the presence of pedestals 308 may enable stacking of an intermodal container on top of a well car insert 100, when the well car insert is not in use.

In order to engage the sockets of a second well car insert and/or an intermodal container, the vertical height of pedestals 308 should be such that pedestals 308 extend above any other components of well car insert 100. For example, pedestals 308 should extend past the vertical extent of hitch 102, when hitch 102 is in its collapsed configuration. In certain embodiments, pedestals 308 have a greater vertical extent than pedestals 308, located on well car 300, in order to extend past the vertical extent of collapsed hitch 102. In some embodiments, when hitch 102 is in its collapsed configuration, the maximum vertical extent of hitch 102 is approximately flush with the upper surface of well insert 100 near pedestals 308 (e.g., hitch 102 is positioned on a surface of well car insert 100 that is recessed as compared with the surface of well car insert 100 near pedestals 308). In such embodiments, pedestals 308 may have approximately the same vertical extent as conventional pedestals 302 on well car 300.

In some embodiments, pedestals 308 may be replaced with sockets, and interbox connectors may be used to couple a first well car insert 100 to a second well car insert (or an intermodal container to a well car insert 100). For example, an interbox connector may be coupled to each socket that is located on the upper surface of well car insert 100, thereby creating a pedestal into which a corresponding socket that is located on the underside of another well car insert and/or an intermodal container may fit. Similar to the discussion above, this disclosure contemplates that when sockets are used on the upper surface of well car insert 100, they are appropriately sized such that when coupled to an interbox connector, the pedestal of the interbox connector is of a sufficient vertical extent to clear the vertical extent of collapsed hitch 102.

FIG. 3C illustrates the use of well car insert 100 in well car 300 to transport a semi-trailer 114. For clarity, the side sill 306 of well car 300 (illustrated in FIG. 3B) has been removed from FIG. 3C such that the hitch 102 of well car insert 100 (composed, in certain embodiments, of king pin receiving plate 202, receiving plate support member 204, and diagonal support member 206) is visible. As can be seen in FIG. 3C, when engaged to well car insert 100, the wheels 116c/d of semi-trailer 114, which are resting on deck 110b, as well as the landing gear 118 of semi-trailer 114 are contained within the well of well car 100 such that, in certain embodiments, only the container of semi-trailer 114 extends past the side sills of well car 300.

While FIGS. 1 through 3C present an example embodiment of well car insert 100 that includes a frame formed from first member 112, second members 106a through 106c, and third members 108a through 108c; a platform 104 and hitch 102 located near a first end of the frame; and a pair of decks 110a and 110b located near the opposite end of the frame, this disclosure contemplates that any structure that includes a hitch 102, deck(s) 110a/b to hold the wheels of a trailer, and sockets 214a/b and 216a/b that are positioned on the structure such that they are able to engage the pedestals 302 of a conventional well car 300 may be used. For example, FIG. 4 presents an alternative embodiment of a well car insert 400 that is configured to hold a pair of trailers (e.g., a pair of trailers that are each twenty feet in length).

Figure 4:
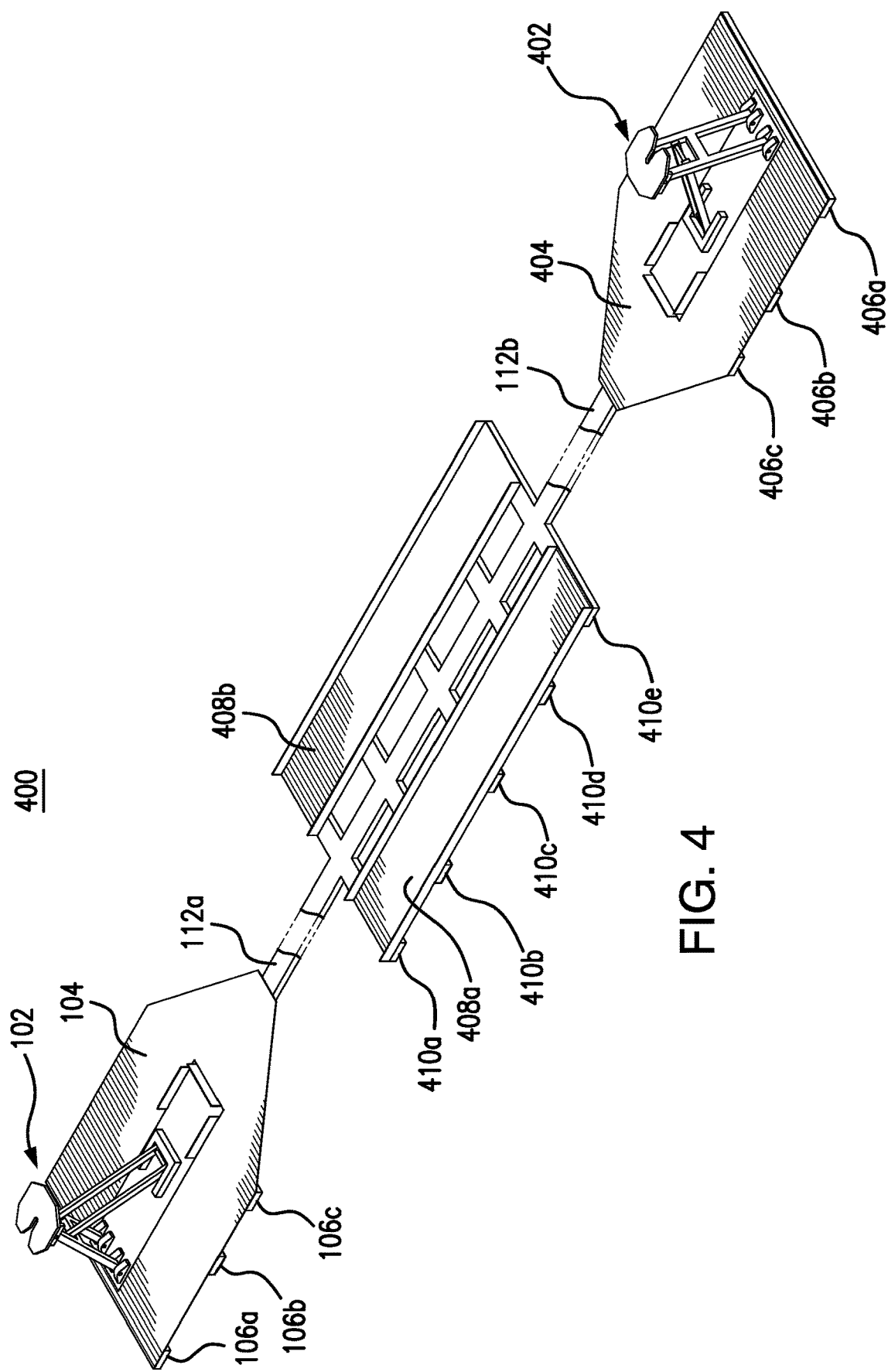
FIG. 4 illustrates an example well car system, to which a pair of semi-trailers may be attached.

As illustrated in FIG. 4, similar to well car insert 100, well car insert 400 includes a hitch 102 positioned on top of a platform 104 and mounted on top of second members 106a through 106c, near a first end of the insert (near the end of first portion 112a of first member 112). However, rather than being located near the second end of the insert, insert 400 includes a pair of decks 408a and 408b that are located near the middle of the insert. Decks 408a and 408b are positioned above a set of third members 410a through 410e that are positioned on first member 112 such that a first portion 112a of first member 112 extends from one end of decks 408a and 408b, and a second portion 112b of first member 112 extends from the opposite end of decks 408a and 408b. Well insert 400 may include any number of third members 410a through 410e. As illustrated in FIG. 4, a first portion of each of third members 410a through 410e may extend in a perpendicular direction away from a side of first member 112, and a second portion of each of third members 410a through 410e may extend in a perpendicular direction away from the opposite side of first member 112, such that each of third members 410a through 410e are 25 approximately centered around first member 112. Third members 410a through 410e may be coupled to first member 112 in a similar manner as described above, with respect to third members 108a through 108c.

A second hitch 402 is located at the second end of insert 400 (near the end of second portion 112b of first member 112). Second hitch 402 is positioned on top of a platform 404 and mounted on top of second members 406a through 406c, and a portion of second portion 112b, in a similar manner as described above for first hitch 102. The orientation of second hitch 402 on insert 400 is rotated 108 degrees as compared with the orientation of first hitch 102. In this manner, insert 400 is configured to hold a pair of trailers that are positioned end-to-end on insert 400, such that the wheels of each trailer rest on platforms 408a and 408b, which are positioned in the middle of the insert. Platforms 408a and 408b are of a suitable length to accommodate the wheels of both trailers.

Similar to the discussion of FIG. 2C, sockets 214a/b and 216a/b may be coupled to the underside of the frame of well car insert 400, at suitable locations such that, when insert 400 is inserted into a well car, the sockets are configured to engage the pedestals 302 of the well car. For example, a first pair of sockets may be coupled to the underside of second member 106b, and a second pair of sockets may be coupled to the underside of second member 406b.

Figure 5:
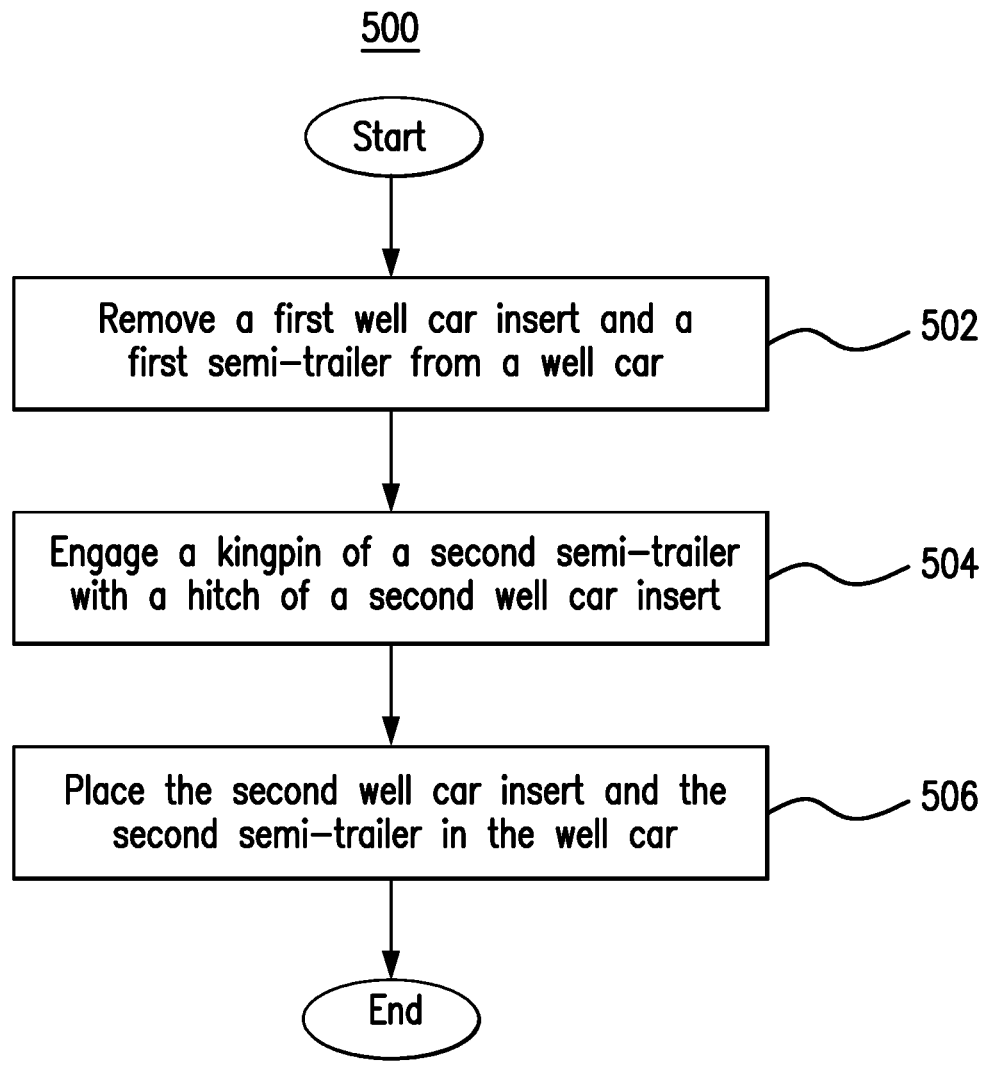
FIG. 5 presents a flowchart illustrating a method by which the well car systems of FIG. 1 and/or FIG. 4 may be used to transport semi-trailers within a well car.

FIG. 5 presents an example method 500 by which well car insert 100/400 may be used to transport a semi-trailer 114 within a well car 300. In step 502 a first well car insert 100/400 to which a first semi-trailer 114 is attached is removed from the well car. In certain embodiments, removing insert 100/400 from well car 300 includes (1) disengaging the first semi-trailer 114 from the hitch 102 of the first well car insert 100/400, (2) removing the first semi-trailer 114 from well car 300 (e.g., lifting semi-trailer 114 out of well car 300 using a crane), and (3) removing first well car insert 100/400 from well car 300 (e.g., lifting well car insert 100/400 out of well car 300 using a crane). In certain embodiments, these steps additionally include removing any wheel tie downs, that were used to secure the wheels of the semi-trailer to the decks 110a/b of the first insert 100/400. In some embodiments, removing insert 100/400 from well car 300 includes removing the insert while semi-trailer 114 is still attached to the insert (e.g., lifting both insert 100/400 and semi-trailer 114 out of well car 300 at the same time). In certain embodiments, well car 300 may initially be empty, such that this first step is not performed. In some embodiments, rather than removing a first insert 100/400 from well car 300, step 502 involves removing an intermodal container from well car 300.

In step 504 the kingpin of a second semi-trailer 114 is engaged to a hitch 102 of a second well car insert 100/400. In certain embodiments, step 504 may additionally include securing one or more wheels of the second semi-trailer 114 to the decks 110a/b of the well car insert 100/400. In step 506 well car insert 100/400, to which semi-trailer 114 is attached, is placed within well car 300. This includes engaging the pedestals 302 on well car 300 with corresponding sockets 214a/b and 216a/b on insert 100/400.

In certain embodiments, semi-trailers may be secured to well car inserts 100/400 prior to loading into well car 300, and disengaged from well car inserts 100/400 after the insert has been removed from well car 300. This may increase the efficiency of the loading and unloading processes.

In certain embodiments, steps 504 and 506 are performed in the opposite order. For example, well car insert 100/400 may first be placed within well car 300, followed by semi-trailer 114 being placed on top of insert 100/400 and secured to insert 100/400. For example, in certain embodiments, well car insert 100/400 may be used to convert from a conventional well car for intermodal container transport to a well car for trailer transport. In such embodiments, insert 100/400 may be placed into well car 300, and then left within well car 300 for a period of time while well car 300 is used to transport multiple trailers using well car insert 100/400.

Modifications, additions, or omissions may be made to method 500 depicted in FIG. 5. Method 500 may include more, fewer, or other steps. For example, steps may be performed in parallel or in any suitable order. One or more steps may be performed by an individual, a machine, any other device, or a combination of the preceding.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system for a well car facilitating transport of both intermodal containers and semi-trailers, the system comprising:
   a frame comprising:
      a central member;
      a set of cross members, each cross member of the set of cross members comprising a first section and a second section, wherein:
         the first section is coupled to a first side of the central member, the first section extending from the first side in a first direction generally perpendicular to the central member;
         the second section is coupled to a second side of the central member, the second side opposite the first side, the second section extending from the second side in a direction generally perpendicular to the central member;
      a first pair of sockets located near a first end of the frame, each socket of the first pair of sockets configured to engage a support casting of a first pair of support castings located at a first position along a length of a well car; and
      a second pair of sockets located near a second end of the frame opposite the first end of the frame, each socket of the second pair of sockets configured to engage a support casting of a second pair of support castings located at a second position along the length of the well car;
   a hitch coupled to the frame near the first end of the frame, wherein the hitch is a collapsible hitch configured to move between a generally erect position and a generally horizontal collapsed position;
   a first deck coupled to the frame, the first deck configured to hold wheels of a trailer when the trailer is coupled to the hitch;
   wherein;
      a first cross member of the set of cross members further comprises the first pair of sockets;
      a second cross member of the set of cross members further comprises the second pair of sockets;
      the first pair of sockets and the second pair of sockets are located on a bottom side of the frame; and
      the frame further comprises:
         a first pair of pedestals, each pedestal of the first pair of pedestals positioned on a top side of the frame above a socket of the first pair of sockets, the top side of the frame opposite the bottom side of the frame; and
         a second pair of pedestals, each pedestal of the second pair of pedestals positioned on the top side of the frame above a socket of the second pair of sockets, wherein a railcar container is configured to engage each pedestal of the first pair of pedestals and each pedestal of the second pair of pedestals when the hitch is configured in the generally horizontal collapsed position.

2. The system of claim 1, further comprising a platform coupled to the frame near the first end of the frame, wherein the hitch is coupled to the platform.

3. The system of claim 1, further comprising a second deck coupled to the frame, wherein the first deck is configured to hold wheels located on a first side of the trailer when the trailer is coupled to the hitch, and the second deck is configured to hold wheels located on a second side of the trailer where the trailer is coupled to the hitch, the second side opposite the first side.

4. The system of claim 1, further comprising a second hitch coupled to the frame near the second end of the frame, wherein the first deck is further configured to hold wheels of a second trailer when the second trailer is coupled to the second hitch.

5. A method comprising:
   coupling a trailer to a well car system, the well car system comprising:
      a frame comprising:
         a central member;
         a set of cross members, each cross member of the set of cross members comprising a first section and a second section, wherein:
            the first section is coupled to a first side of the central member, the first section extending from the first side in a first direction generally perpendicular to the central member;
            the second section is coupled to a second side of the central member, the second side opposite the first side, the second section extending from the second side in a direction generally perpendicular to the central member;
         a first pair of sockets located near a first end of the frame, each socket of the first pair of sockets configured to engage a corresponding support casting of a first pair of support castings located at a first position along a length of a well car;
         a second pair of sockets located near a second end of the frame opposite the first end of the frame, each socket of the second pair of sockets configured to engage a corresponding support casting of a second pair of support castings located at a second position along the length of the well car;
      a hitch coupled to the frame near the first end of the frame, wherein the hitch is a collapsible hitch configured to move between a generally erect position and a generally horizontal collapsed position;
      a first deck coupled to the frame, the first deck configured to hold wheels of a trailer when the trailer is coupled to the hitch;
      wherein:
         a first cross member of the set of cross members further comprises the first pair of sockets;
         a second cross member of the set of cross members further comprises the second pair of sockets;
         the first pair of sockets and the second pair of sockets are located on a bottom side of the frame; and
         the frame further comprises:
            a first pair of pedestals, each pedestal of the first pair of pedestals positioned on a top side of the frame above a socket of the first pair of sockets, the top side of the frame opposite the bottom side of the frame; and
            a second pair of pedestals, each pedestal of the second pair of pedestals positioned on the top side of the frame above a socket of the second pair of sockets, wherein a railcar container is configured to engage each pedestal of the first pair of pedestals and each pedestal of the second pair of pedestals when the hitch is configured in the generally horizontal collapsed position; and inserting the well car system into a well car, wherein inserting the well car system into the well car comprises:

engaging each support casting of the first pair of support castings with the corresponding socket of the first pair of sockets; and engaging each support casting of the second pair of support castings with the corresponding socket of the second pair of sockets.

6. The method of claim 5, wherein:
the well car system further comprises a platform coupled to the frame near the first end of the frame; and
the hitch is coupled to the platform.

7. The method of claim 5, further comprising:
uncoupling the trailer from the well car system;
removing the trailer from the well car;
collapsing the hitch by moving it to the generally horizontal collapsed position; and
inserting a railcar container into the well car.

8. The method of claim 5, further comprising a second deck coupled to the frame, wherein the first deck is configured to hold wheels located on a first side of the trailer when the trailer is coupled to the hitch, and the second deck is configured to hold wheels located on a second side of the trailer where the trailer is coupled to the hitch, the second side opposite the first side.

9. The method of claim 5, further comprising coupling a second trailer to the well car system, wherein:
the well car system further comprises a second hitch coupled to the frame near the second end of the frame; and
the first deck is further configured to hold wheels of the second trailer when the second trailer is coupled to the second hitch.

10. A system comprising:
a well car;
a frame comprising:
a central member;
a set of cross members, each cross member of the set of cross members comprising a first section and a second section, wherein:
the first section is coupled to a first side of the central member, the first section extending from the first side in a first direction generally perpendicular to the central member;
the second section is coupled to a second side of the central member, the second side opposite the first side, the second section extending from the second side in a direction generally perpendicular to the central member;
a first pair of sockets located near a first end of the frame, each socket of the first pair of sockets releasably engaged to a support casting of a first pair of support castings located at a first position along a length of the well car; and
a second pair of sockets located near a second end of the frame opposite the first end of the frame, each socket of the second pair of sockets releasably engaged to a support casting of a second pair of support castings located at a second position along the length of the well car;
a hitch coupled to the frame near the first end of the frame, wherein the hitch is a collapsible hitch configured to move between a generally erect position and a generally horizontal collapsed position;
a first deck coupled to the frame, the first deck configured to hold wheels of a trailer when the trailer is coupled to the hitch;
wherein a first cross member of the set of cross members further comprises the first pair of sockets;
a second cross member of the set of cross members further comprises the second pair of sockets;
the first pair of sockets and the second pair of sockets are located on a bottom side of the frame; and
the frame further comprises:
a first pair of pedestals, each pedestal of the first pair of pedestals positioned on a top side of the frame above a socket of the first pair of sockets, the top side of the frame opposite the bottom side of the frame; and
a second pair of pedestals, each pedestal of the second pair of pedestals positioned on the top side of the frame above a socket of the second pair of sockets, wherein a railcar container is configured to engage each pedestal of the first pair of pedestals and each pedestal of the second pair of pedestals when the hitch is configured in the generally horizontal collapsed position.

11. The system of claim 10, further comprising a platform coupled to the frame near the first end of the frame, wherein the hitch is coupled to the platform.

12. The system of claim 10, further comprising a second hitch coupled to the frame near the second end of the frame, wherein the first deck is further configured to hold wheels of a second trailer when the second trailer is coupled to the second hitch.

* * * * *